(12) United States Patent
Zhang

(10) Patent No.: US 10,335,849 B2
(45) Date of Patent: Jul. 2, 2019

(54) FULL AUTOMATIC WIRELESS MOULD CHANGING VEHICLE AND SYSTEM FOR PRESS

(71) Applicant: Sanyi Zhang, Jinan (CN)

(72) Inventor: Sanyi Zhang, Jinan (CN)

( * ) Notice: Subject to any disclaimer, the term of this patent is extended or adjusted under 35 U.S.C. 154(b) by 236 days.

(21) Appl. No.: 15/469,972

(22) Filed: Mar. 27, 2017

(65) Prior Publication Data

US 2018/0272584 A1  Sep. 27, 2018

(51) Int. Cl.
   *B21D 37/14*  (2006.01)
   *B30B 15/02*  (2006.01)
   *B29C 31/00*  (2006.01)

(52) U.S. Cl.
   CPC .......... *B21D 37/147* (2013.01); *B29C 31/006* (2013.01); *B30B 15/028* (2013.01); *Y10T 483/1729* (2015.01)

(58) Field of Classification Search
   CPC ........ Y10T 483/1729; Y10T 483/1731; B21D 37/145; B21D 37/147; B29C 31/006; B29C 45/176; B30B 15/028
   USPC ...................................................... 483/28, 29
   See application file for complete search history.

(56) References Cited

U.S. PATENT DOCUMENTS

| | | | | |
|---|---|---|---|---|
| 2,996,025 A | * | 8/1961 | Vasil | B21D 37/14 100/214 |
| 3,516,277 A | * | 6/1970 | Bracco | B21D 37/14 100/207 |
| 5,040,403 A | * | 8/1991 | Henderson | B21D 37/14 72/446 |
| 5,129,254 A | * | 7/1992 | Keizer | B21D 37/14 100/229 R |
| 5,366,431 A | * | 11/1994 | Smith | B21D 5/02 483/1 |
| 5,443,436 A | * | 8/1995 | Kawakami | B21D 37/14 483/29 |
| 5,582,062 A | * | 12/1996 | Sommer | B21D 37/14 100/918 |
| 5,676,014 A | * | 10/1997 | Sanford | B21D 37/14 72/405.1 |
| 6,000,322 A | * | 12/1999 | To | B21D 43/05 100/224 |
| 2006/0160684 A1 | * | 7/2006 | Springston | B29C 31/006 483/1 |

* cited by examiner

Primary Examiner — Erica E Cadugan
Assistant Examiner — Michael Vitale
(74) Attorney, Agent, or Firm — Oliff PLC

(57) ABSTRACT

A full-automatic wireless die change cart and system for a press. The full-automatic wireless die change cart includes an upper working table and a lower working table which are connected together up and down of driving devices. The lower working table is driven by a driving device I to move back and forth, while the upper working table is driven by a driving device II to move rightwards or leftwards. Baffles, die lifting arms, and guide rails, all in parallel to one another, are disposed in order from outside to inside at two opposite ends of the upper working table, and push-and-pull devices, baffles, and fixed supporting plate assemblies are disposed in order from outside to inside at the other two ends perpendicular to the two ends.

9 Claims, 11 Drawing Sheets

FULL AUTOMATIC WIRELESS MOULD CHANGING VEHICLE AND SYSTEM FOR PRESS

TECHNICAL FIELD

The present invention discloses a full-automatic wireless die change cart and system for a press, which are suitable for presses.

BACKGROUND ART

At present, die change of a press relies largely on Automatic Die Change (ADC) of a working table. The precondition of ADC is that the production personnel should accurately place a die on the working table in advance by means of an overhead traveling crane. This way has the following disadvantages (characteristics are different with respect to different production occasions, which is subject to practical situation):
(1) For die change every time, the die needs to be conveyed by means of the overhead traveling crane to the die change cart, which occupies the resource of overhead traveling cranes.
(2) Limited by the cable, the die change cart can only be capable of rectilinear motion within a small range. Thus, space around the press or an injection molding machine is occupied.
(3) Some die change carts can only be operated manually; the operations are complicated, and high requirements are proposed on the quality of the operating personnel.
(4) The operating personnel need to go to a fixed control console to conduct operations, i.e., they need to go around.
(5) The personnel on the spot need to pay attention to the die conveyed by the overhead traveling crane because the die is often very heavy with a high danger coefficient.

SUMMARY OF THE INVENTION

The die change cart provided by the present invention is based on Siemens' profinet wireless network technique, and by means of guided rails laid on the ground, automatic die conveying may be achieved easily without an overhead traveling crane during production, and a die may be accurately conveyed to the working table. The present invention is suitable for use in production occasions where no overhead traveling crane is installed or crane scheduling is difficult, or there are few operators.

The technical solution used by the present invention is as follows:

A multi-station full-automatic wireless die change cart comprises an upper working table and a lower working table which are connected together up and down by means of driving devices, wherein the lower working table is driven by a driving device I to move back and forth, while the upper working table is driven by a driving device II to move rightwards or leftwards; baffles, die lifting arms, and guide rails, in parallel to one another, are disposed in order from outside to inside at two opposite ends of the upper working table, and push-and-pull devices, baffles, and fixed supporting plate assemblies are disposed in order from outside to inside at the other two ends perpendicular to said two ends; besides, the baffles, the die lifting arms, the guide rails, the push-and-pull devices, and the fixed supporting plate assemblies at the two opposite ends are pairwise symmetric about center lines of the upper working table; and the baffles, the die lifting arms, the push-and-pull devices, the guide rails and the fixed supporting plate assemblies are capable of moving up and down when driven by respective driving devices III.

The driving devices, the driving device I, the driving device II and the driving devices III are connected to respective controllers; the controllers communicate with a master control station by means of a wireless network; and the master control station is connected to a remote control device by means of a wireless network.

Up-and-down motion of the upper working table and the lower working table is controlled by two-way oil cylinders, and proximity switches are mounted on the upper working table to control a distance of extension or retraction; two ends of front and rear baffles, 6 in total, are connected to oil cylinders, and a distance of rising or falling of the baffles is also controlled by means of proximity switches; two ends of the left and right baffles are also connected to oil cylinders, and a distance of rising or falling of the baffles is also controlled by means of proximity switches; two-way oil cylinders are mounted at lower ends of the push-and-pull devices, and proximity switches for controlling rising and falling of the push-and-pull devices are mounted on the upper working table; two-way oil cylinders are also mounted at two ends of the die lifting arms, and fixed to the upper working table, and proximity switches for controlling rising and falling of the die lifting arms are mounted on the upper working table.

A first-layer power shaft driven by a motor I is mounted at one side of the lower working table, while a first-layer driven shaft is mounted at the other side thereof; flat-face wheels are mounted on the first-layer power shaft, while guide wheels are mounted on the first-layer driven shaft, and the driving motor I drives the first-layer power shaft to rotate, driving the first-layer driven shaft to move back and forth.

A power shaft or a second-layer power shaft driven by a motor II is mounted at one side of the upper working table, while a second-layer driven shaft is mounted at the other side thereof; flat-face wheels are mounted on the second-layer power shaft, while guide wheels are mounted on the second-layer driven shaft, and the driving motor II drives the second-layer power shaft to rotate, driving the second-layer driven shaft to move rightwards or leftwards.

The baffles include a plurality of long baffles and short baffles parallel to one another, and the short baffles keep close to the long baffles and are disposed spaced apart from each other.

The guide rails include long guide rails and short guide rails. The short guide rails are mounted at ends of the long guide rails. The short guide rails are mounted on the push-and-pull devices. The push-and-pull heads of the push-and-pull devices are capable of sliding back and forth along the long guide rails.

The push-and-pull device comprises a support; a motor is mounted on the support; the motor is connected to two driving shafts disposed on the left and right by means of couplings, respectively; a chain wheel is mounted on each driving shaft; each chain wheel drives a chain block to move along long guide rails by means of a chain, and the two chain blocks are both connected to a connecting plate; hook blocks are disposed at two ends of the two connecting plates, respectively; a shackle is disposed at one side of each hook block; the bottom of the shackle is driven by an air cylinder; and the shackles serve to, when a die is pulled in place by means of a push-and-pull head on the device, separate the hook blocks on the push-and-pull head from the die.

The connecting plate moves back and forth along the long guide rails when being driven by the chains.

A left push-and-pull head box and a right push-and-pull head box are mounted at two sides of each chain wheel. Each of the left push-and-pull head box and the right push-and-pull head box is connected to a short guide rail by means of a connecting plate.

The push-and-pull device is capable of moving up and down when driven by air cylinders, thereby achieving up-and-down movement of the short guide rails.

The die lifting arm comprises a rectangular hollow support; a plurality of pin shafts are disposed in parallel within and connected to the support, and a roller sleeves each pin shaft.

The fixed supporting plate assembly comprises a rectangular hollow fixed supporting plate; a plurality of pin shafts are disposed within and connected to the fixed supporting plate; a roller sleeves each pin shaft; and a motor driving device is mounted at one end of the fixed supporting plate, and connected to a plurality of chain wheels mounted at a side of the fixed supporting plate by means of chains.

Regarding the connection of the upper and lower working tables, they are located by guide pillars and copper sleeves and connected up and down by oil cylinders.

A multi-station full-automatic wireless die change system comprises a die change cart. The die change cart is capable of moving laterally and longitudinally along guide rails, and an automatic charging device, location detection plates and a storage table are mounted at sides of the guide rails; and the die change cart, the automatic charging device, the detection plates and the storage table are all controlled by one control cabinet.

The storage table comprises a support; a plurality of rollers are mounted at two ends of the support, and a driving motor is mounted at the bottom of the support; the driving motor drives chain wheels mounted on roller driving shafts to rotate by means of chains; and air cylinder driving devices are disposed at the end of the support that is adjacent to the guide rails.

The present invention has the following beneficial effects:
1. There is no need of an overhead traveling crane to convey a die during production, and the die change cart is capable of completing die conveying and die change independently: die loading: picking up a die from the storage table, conveying the die to the specified working table, and pushing the die onto the working table; and
die unloading: pulling back a die from the working table, conveying the die to the specified die storage table, and storing the die on the die storage table.
2. The die change cart is based on the wireless network technique. Stable and reliable wireless control mode frees the die change cart from a cable, such that the die change cart is not limited to straight reciprocating motion within a small range as before. The reliability of the wireless network may ensure that the repetitive location error of the die change cart is smaller than 2 mm. Thus, the die change cart is able to move within a wider range without occupying the space of accessories of a press or an injection molding machine.
3. Based on Siemens' reliable electrical control system and wireless network technique at present, the die change cart achieves one-button die change in the whole die change process including up to 20 steps. The automatic die change process contributes to great simplification of the operating process of the field production personnel.
4. By using a remote controller, the field production personnel avoid going around. A person can start the die change process at a distance as long as the die change cart operates in normal condition.
5. The die change cart operates depending on rails with strict control on the speed of conveying. Music plays for warning in the whole die change process, and without lifting process, and therefore, the safety coefficient is greatly increased.
6. The die change cart provided by the present invention may be applicable to die change of a press line with a single press or a plurality of presses, and is convenient to use.

BRIEF DESCRIPTION OF THE DRAWINGS

To describe more clearly technical solutions in embodiments of the present invention or the prior art, figures needing to be used in descriptions of the embodiments or the prior art will be presented briefly. It would be obvious that the figures in the following descriptions are some embodiments of the present invention, and for those of ordinary skill in the art, other figures may also be obtained according to these figures without creative work.

Figure 1:
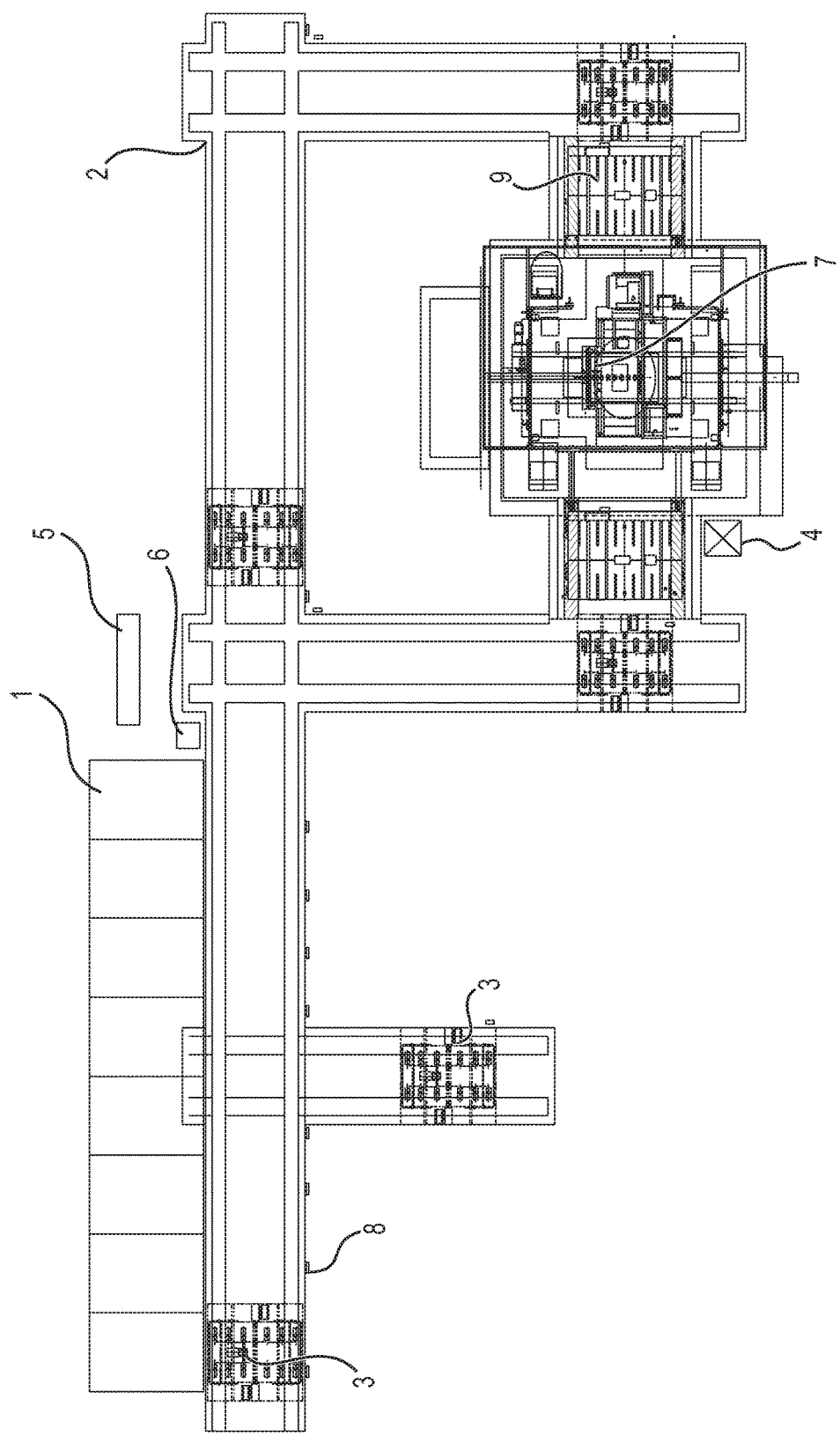
FIG. 1 shows a multi-station full-automatic wireless die change system.

Reference numerals in the figures represent as follows:
1, storage table, 2, guide rails, 3, die change cart, 4, punch operating platform, 5, die change cart control cabinet, 6, automatic charging device, 7, punch, 8, location detection plate, and 9, working table.
3-1, long baffle, 3-2, short baffle, 3-3, die lifting arm assembly, 3-4, fixed supporting plate assembly, 3-5, lower working table, 3-6, upper working table, 3-7, driving motor, 3-8, oil cylinder, 3-9, baffle on the left or right, 3-10, push-and-pull device, 3-11, long guide rail, 3-12, guide wheel, 3-13, flat-face wheel, 3-14, driving motor, 3-15, coupling, 3-16, short guide rail, 3-17, shackle, 3-18, first-layer driven shaft, 3-19, first-layer power shaft, 3-21, die lifting arm, 3-22, pin shaft, 3-23, roller, 3-24, bearing, 3-25, spacer ring, 3-26, shaft clamp spring, 3-27, fixed supporting plate, 3-28, roller, 3-30, fixing block, 3-32, pin shaft, 3-34, roller, 3-35, compression plate, 3-36, chain wheel, 3-37, guide wheel baffle, 3-38, idle wheel, 3-39, motor driving device, 3-42, hook block, 3-43, bearing roller, 3-46, connecting plate, 3-47, right push-and-pull head box, 3-48, left push-and-pull head box, 3-49, support, 3-50, motor, 3-51, shaft, 3-52, connecting plate, 3-53, push block, and 3-54, oil cylinder.
1-1, support, 1-2, guide plate, 1-3, fixing block, 1-4, chain wheel, 1-6, storage table supporting plate, 1-7, roller, 1-8, bearing, 1-9, adjusting shim, 1-10, baseplate, 1-11, weld bolt, 1-12, guide plate, 1-13, motor, 1-14, motor shaft, 1-15, air cylinder, and 1-16, air cylinder.

DETAILED DESCRIPTION OF THE EMBODIMENTS

The present invention will be described in detail below in conjunction with the figures. A multi-station full-automatic wireless die change system, as shown in FIG. 1, comprises a storage table 1, guide rails 2, a die change cart 3, a punch operating platform 4, a control cabinet 5, an automatic charging device 6, a punch 7, location detection plates 8, and a working table 9. The die change cart 3 is capable of moving laterally and longitudinally along the guide rails, and the automatic charging device 6, the location detection plates 8 and the storage table 1 are mounted at two sides of the guide rails 2. The die change cart, the automatic charging device, the detection plates and the storage table are all controlled by one control cabinet 5. The working table 9 is mounted on the punch 7, and the punch operating platform 4 is mounted at one side of the punch 7.

Figure 8:
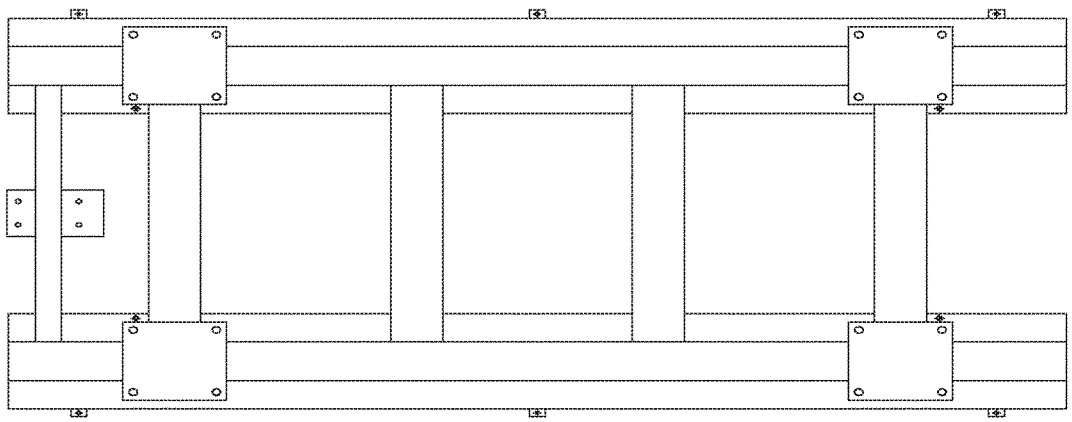
FIG. 8 (1) to FIG. 8(4) show a structure diagram of a storage table device.
Figure 8:
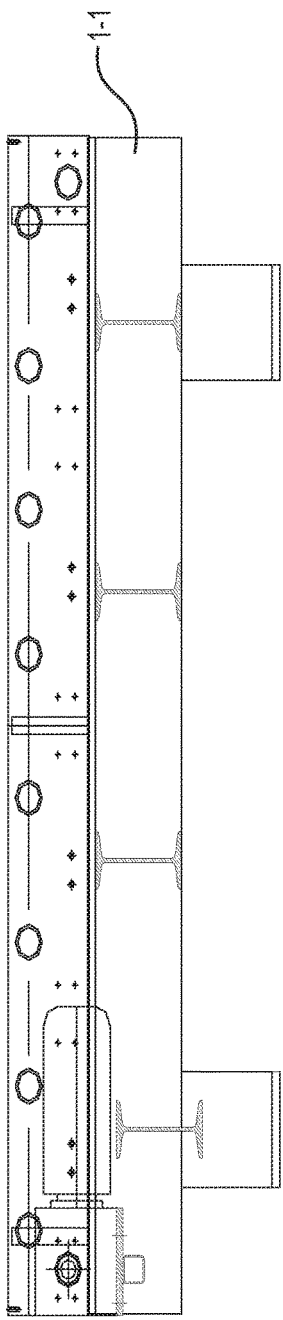
Figure 8:
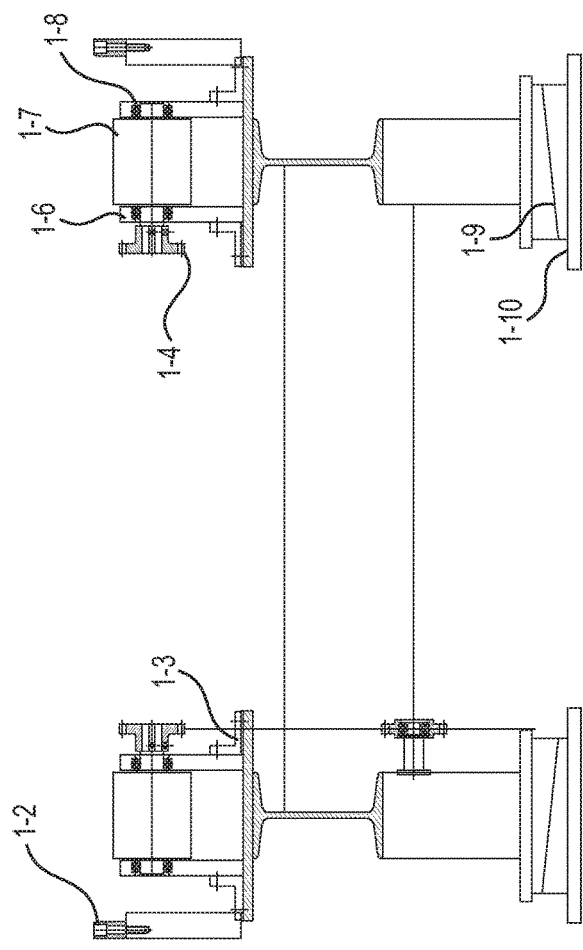
Figure 8:
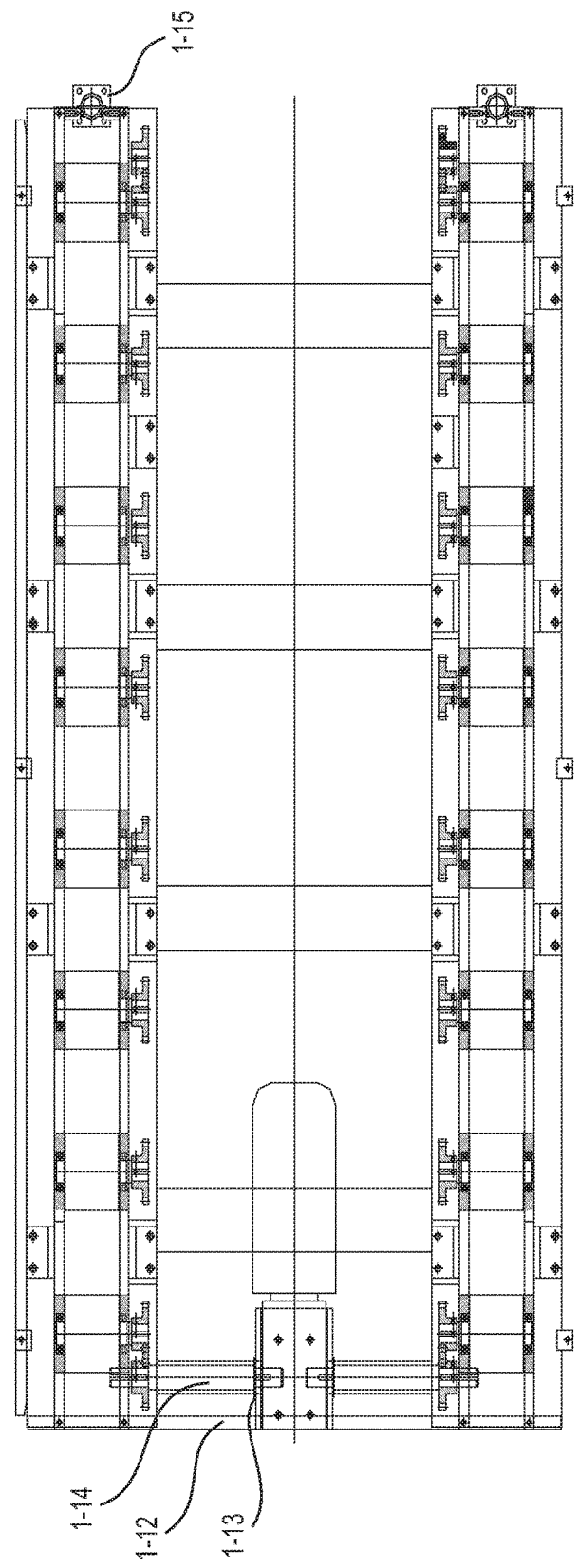

As shown in 8 (1) to FIG. 8 (4), the storage table 1 comprises a support 1-1. A plurality of rollers 1-7 are mounted at two sides of the support 1-1, and a driving motor 1-13 is mounted at the bottom of the support 1-1. A motor shaft 1-14 of the driving motor 1-13 drives, by means of chains, chain wheels 1-4 mounted on roller driving shafts to rotate. Also, a cylinder 1-15 and a cylinder 1-16 are disposed at the end of the support 1-1 that is adjacent to the guide rails.

Guide plates 1-2, guide plates 1-12, and fixing blocks 1-3 are also mounted on the support 1-1. Bearings 1-8 are mounted at two ends of each roller 1-7. Baseplates 1-10 are disposed at the bottom of the support. Adjusting shims 1-9 are mounted on the baseplates 1-10 and fixed by means of weld bolts 1-11.

Figure 2:
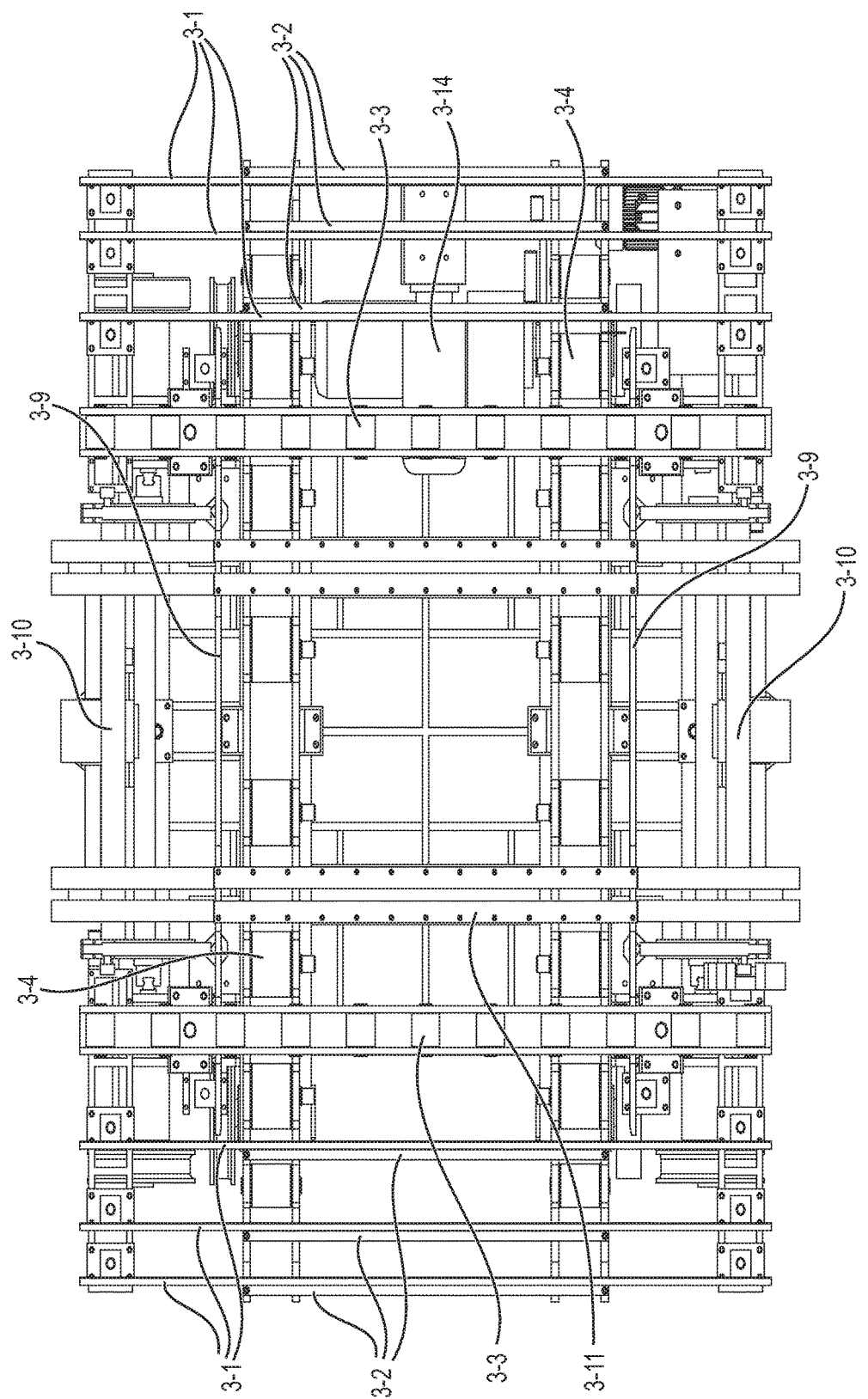
FIG. 2 (1) to FIG. 2 (3) show a structure of a die change cart.
Figure 2:
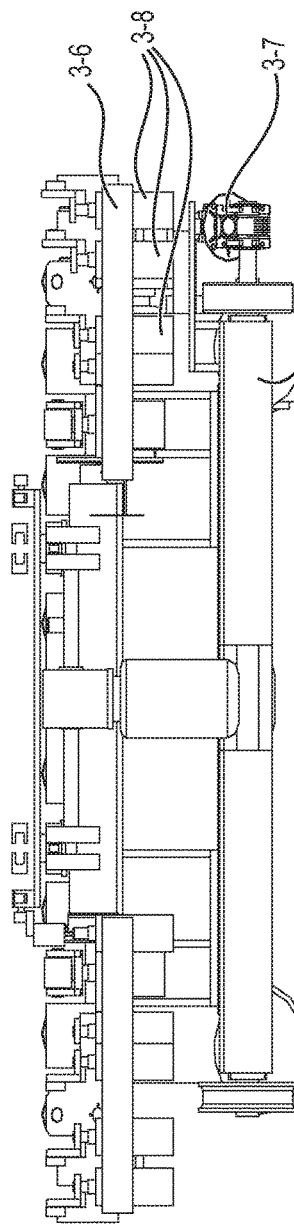
Figure 2:
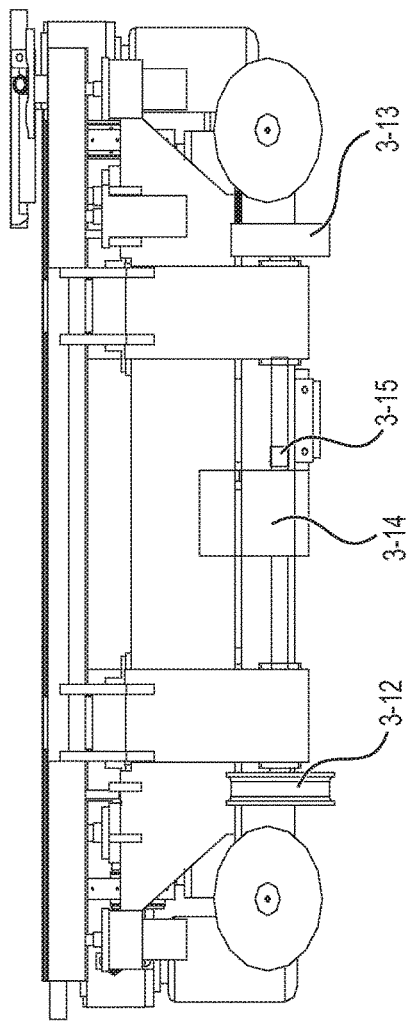
Figure 3:
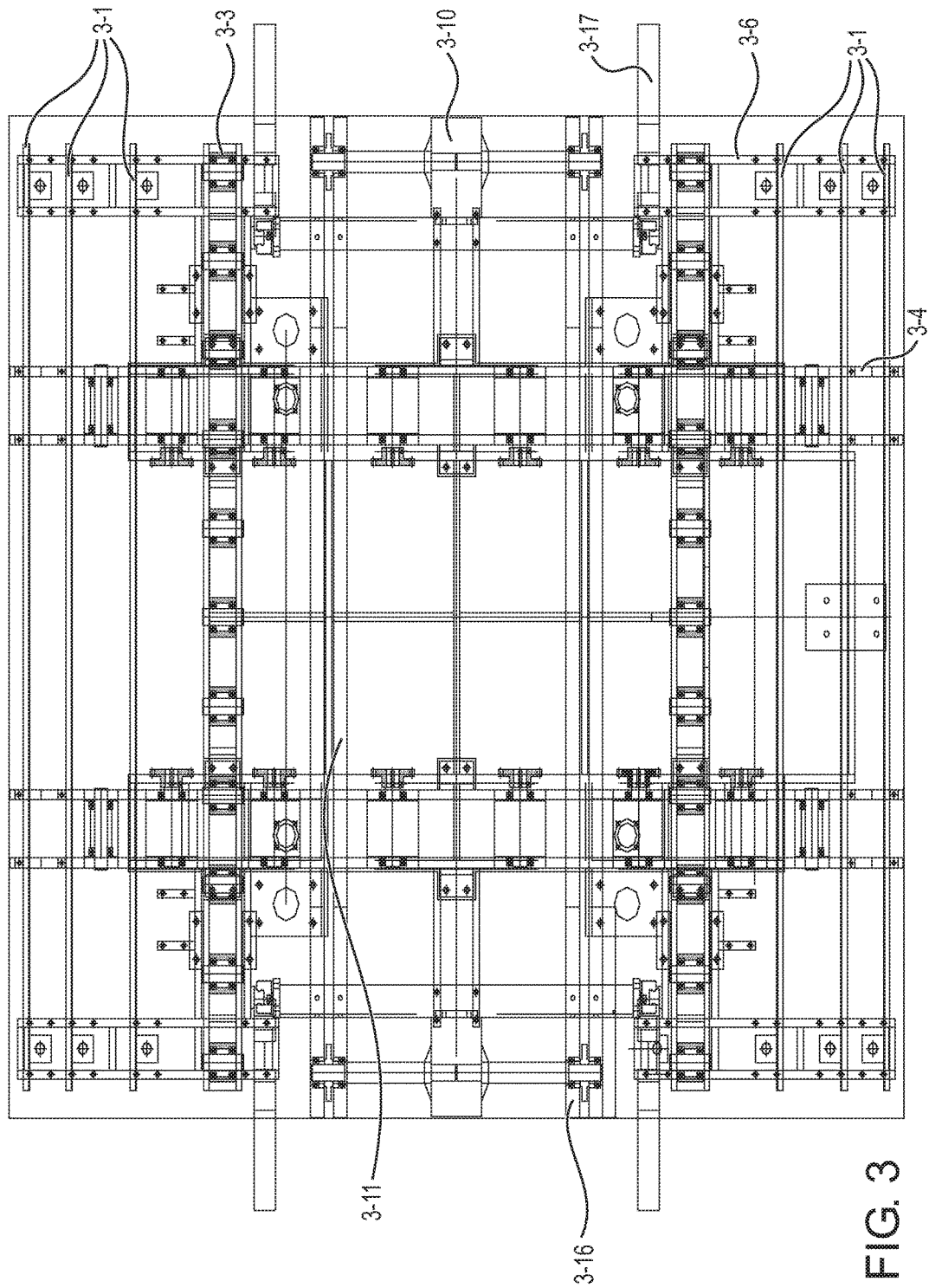
FIG. 3 shows a structure of an upper working table.
Figure 4:
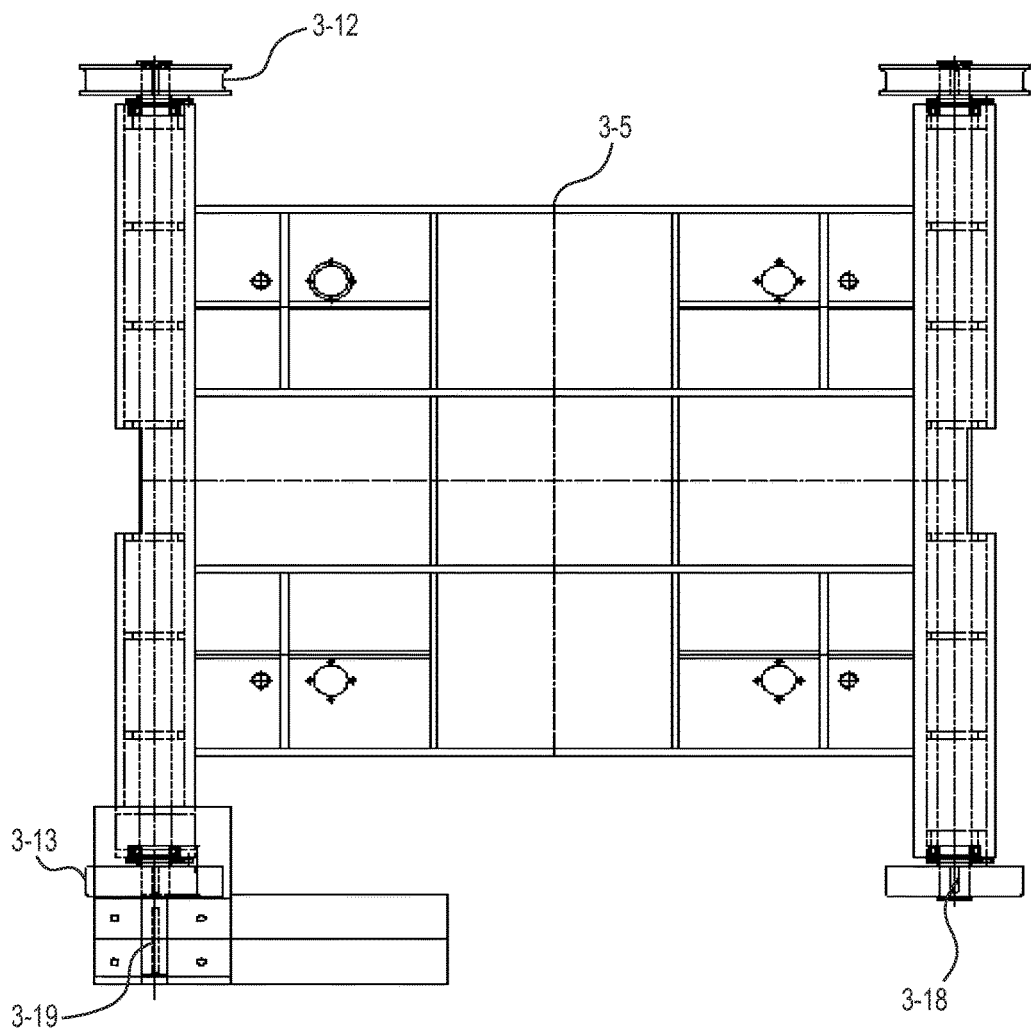
FIG. 4 (1) and FIG. 4 (2) show a structure of a lower working table.
Figure 4:
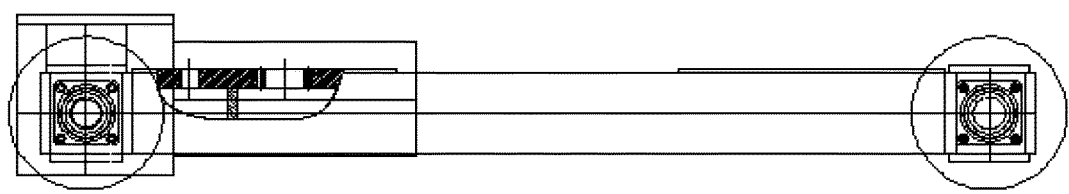
Figure 5:
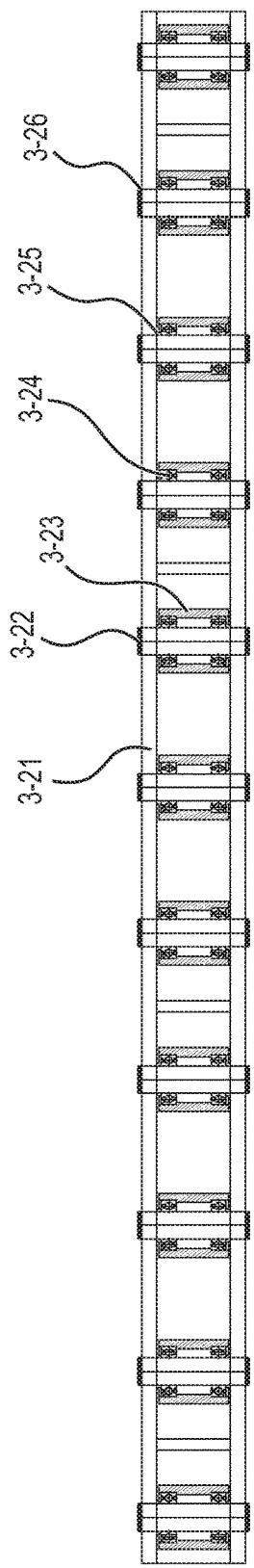
FIG. 5 shows a structure of a die lifting arm assembly.
Figure 6:
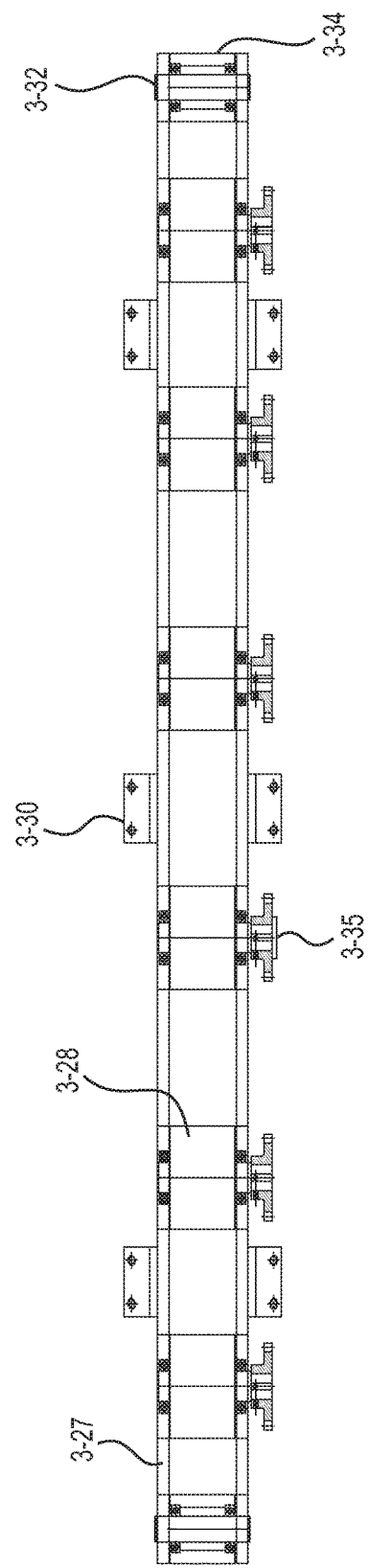
FIG. 6 (1) and FIG. 6 (2) show a structure of a fixed supporting plate assembly.
Figure 6:
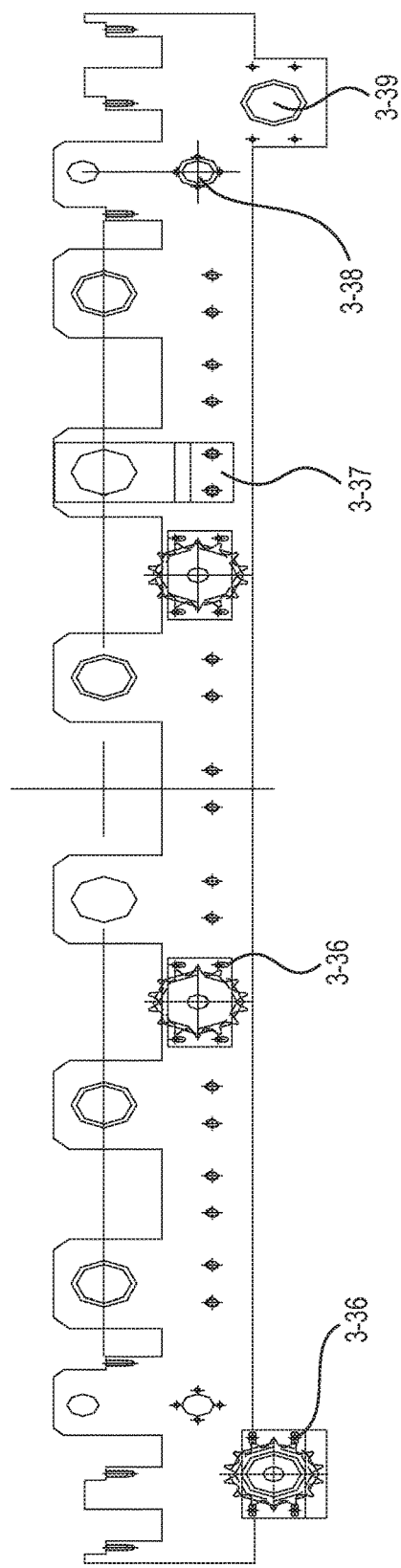
Figure 7:
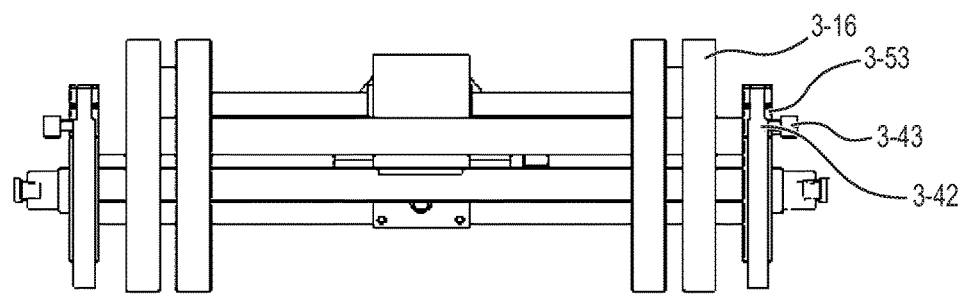
FIG. 7 (1) and FIG. 7 (2) show a structure of a push-pull head device.
Figure 7:
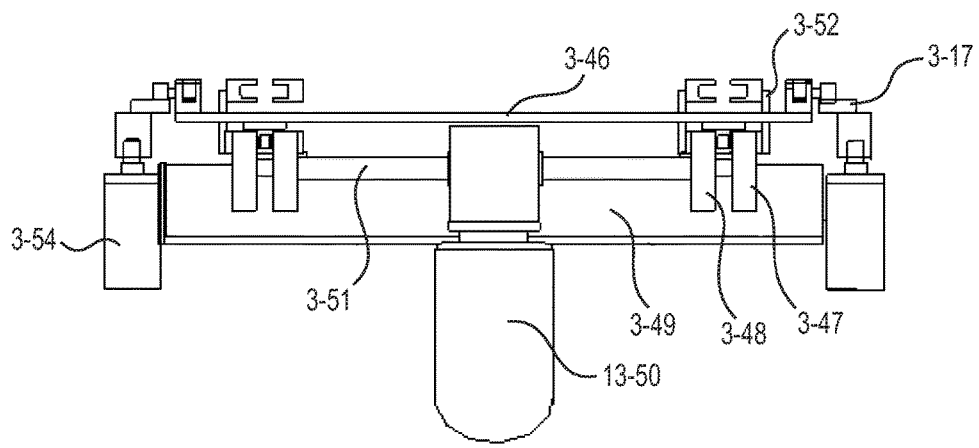

FIG. 2 (1) to FIG. 2(3) show a structure of a die change cart, which comprises an upper working table, a lower working table, die lifting arms, push-and-pull devices, baffles, chain wheels, chains, driving motors, couplings, flat-face wheels, guide wheels, a first-layer power shaft, a first-layer driven shaft, a second-layer power shaft, a second-layer driven shaft, bearing caps, bearings, guide pillars and copper sleeves, fixed supporting plate assemblies, a cart locating device, a die locating device, cover plates, rollers, pin shafts, an oil pressure control system, etc. Specific connection relations of these members are shown as below.

The upper working table 3-6 and the lower working table 3-5 are connected by two-way cylinders with guide pillars and copper sleeves mounted therebetween for guidance.

Regarding the lower working table 3-5, the first-layer power shaft 3-19 is driven by the driving motor 3-7 by means of the coupling 3-15. Two flat-face wheels 3-13 are mounted on the first-layer power shaft 3-19, while two guide wheels 3-12 are mounted on the first-layer driven shaft 3-18 for guidance. The driving motor 3-7 moves back and forth.

A power shaft or a second-layer power shaft driven by a motor II is mounted at one side of the upper working table 3-14, while a second-layer driven shaft is mounted at the other side thereof. Flat-face wheels are mounted on the second-layer power shaft, while guide wheels are mounted on the second-layer driven shaft. The driving motor II drives the second-layer power shaft to rotate, driving the second-layer driven shaft to move rightwards or leftwards.

Long baffles 3-1 and short baffles 3-2, six in total, and the die lifting arm assembly 3-3, all in parallel to each other, are disposed at one end of the upper working table in order from outside to inside, and at two ends perpendicular to this end, two baffles 3-9 on the left and right, push-and-pull devices 3-10, long guide rails 3-11, short guide rails 3-16 and fixed supporting plate assemblies 3-4 are disposed, which are identical to each other, respectively. Moreover, the baffles, the die lifting arm assemblies 3-3 and the guide rails at the two ends are pairwise symmetric about the center line of the upper working table. The short guide rails 3-16 are mounted at both ends of the long guide rails 3-11, and capable of moving up and down under the action of the die lifting arm assemblies 3-3.

Up-and-down motion of the upper working table and the lower working table is controlled by the two-way oil cylinders 3-8, and proximity switches are mounted on the upper working table to control the distance of extension or retraction. Both ends of six baffles at front and back are connected to oil cylinders, and the distance of rising or falling of the baffles is also controlled by means of proximity switches, and it is the same for the baffles at both ends. Two-way oil cylinders are mounted at the lower ends of the push-and-pull devices, and proximity switches for controlling rising and falling of the push-and-pull devices are mounted on the upper working table. Two-way oil cylinders are also mounted at both ends of the die lifting arms, and fixed to the upper working table, and proximity switches for controlling rising and falling of the die lifting arm are mounted on the upper working table.

Regarding the cart locating device, location is achieved through stop detection by means of proximity switches and the detection plates. Regarding the size and an intended position of a die, a program is set up, and when a die is detected by a proximity switch, the corresponding program causes the die to stop for location.

The push-and-pull device essentially consists of push-and-pull head boxes on the left and right, push-and-pull chain cases, chains, a motor, a push-and-pull head driving motor, support push-and-pull shackles, a connecting plate, push blocks of a push-and-pull head, hook blocks of the push-and-pull head, short guide rails, a hydraulic control system, etc. In addition, the push-and-pull chain cases are fixed to the push-and-pull head boxes on the left and right by means of screws. Specific connections of these members are shown as below.

The push-and-pull device comprises a support 3-49. A motor 3-50 is mounted on the support 3-49. The motor 3-50 is connected to two driving shafts 3-51 disposed on the left and right by means of one coupling, respectively. A chain wheel is mounted on each driving shaft. Each chain wheel drives a chain block to move along the long guide rails by means of a chain. Besides, the two chain blocks are both connected to a connecting plate 3-46. Hook blocks are disposed at two ends of the two connecting plates, respectively. A shackle 3-17 is disposed at one side of each hook block 3-42, and the bottom of the shackle 3-17 is driven by an oil cylinder 3-54. The shackles serve to, when a die is pulled in place by means of a push-and-pull head on the device, separate the hook blocks on the push-and-pull head from the die.

The connecting plate 3-46 may move back and forth along the long guide rails when driven by the chains.

A left push-and-pull head box 3-48 and a right push-and-pull head box 3-47 are mounted on both sides of each chain wheel, and each of the left push-and-pull head box and the right push-and-pull head box is connected to a short guide rail by means of a connecting plate.

The push-and-pull device may move up and down when driven by an air cylinder, and thus can move up and down along the short guide rails.

Regarding each hook block, a bearing roller 3-43 is mounted at one end thereof; when the shackle 3-17 is jacked up, it matches with the bearing roller 3-43 such that the hook block opens; and when the shackle 3-17 falls down, it matches with the bearing roller 3-43 such that the hook block is closed.

The fixed supporting plate assembly essentially consists of a fixed supporting plate, a driving motor, rollers, bearings, fixing blocks, chain wheels, idle wheels, guide baffles, etc. Specific connections of these members are shown as below.

The fixed supporting plate 3-27 is a rectangular fixed supporting plate. A plurality of pin shafts 3-32 are disposed within and connected to the fixed supporting plate. A roller 3-28 sleeves each pin shaft 3-32, 3-34. Furthermore, a motor driving device 3-39 is mounted at one end of the fixed supporting plate 3-21, and connected to a plurality of chain wheels 3-36 and idle wheels 3-38 mounted at a side of the fixed supporting plate by means of chains. Fixing blocks 3-30, guide baffles 3-37, and compression plates 3-35 are mounted on the fixed supporting plate.

The die lifting arm assembly 3-3 essentially consists of a support, pin shafts, rollers, bearings, a die lifting arm 3-21, etc. Specific connections of these members are shown as below.

The die lifting arm 3-21 is a rectangular hollow support. A plurality of pin shafts 3-22 are disposed in parallel within and connected to the support, and a roller 3-23 sleeves each pin shaft 3-22, and is connected to the support by means of a bearing 3-24, a spacer ring 3-25 and a shaft clamp spring 3-26.

The storage table essentially consists of a support, guide plates, fixing blocks, chain wheels, storage table supporting plates, rollers, chains, bearings, baseplates, weld bolts, adjusting shims, a driving motor, a motor shaft, electromagnetic valves, air cylinders, air cylinder mounting bases, air cylinder pins, an electrical control system, a pneumatic control system, etc., which will be specifically described below.

The storage table 1 comprises a support 1-1. A plurality of rollers 1-7 are mounted at two sides of the support 1-1, and a driving motor 1-13 is mounted at the bottom of the support 1-1. A motor shaft 1-14 of the driving motor 1-13 drives, by means of chains, chain wheels 1-4 mounted on roller driving shafts to rotate. Also, a cylinder 1-15 and a cylinder 1-16 are disposed at the end of the support 1-1 that is adjacent to the guide rails.

Guide plates 1-2, guide plates 1-12, and fixing blocks 1-3 are also mounted on the support 1-1. Bearings 1-8 are mounted at two ends of each roller 1-7. Baseplates 1-10 are disposed at the bottom of the support. Adjusting shims 1-9 are mounted on the baseplates 1-10 and fixed by means of weld bolts 1-11.

The cart locating device and a die safety device essentially consist of air cylinders, locating pins, detection plates, guide plates, etc.

The die safety device is fixed to the upper edge of the storage table to prevent a die from slipping out of the storage table. Movements of the air cylinders are controlled by electromagnetic valves, such that the locating pins stretch out and draw back.

Cart guide rails essentially consist of light rails, and a leveling device, etc.

The system also comprises a pneumatic control system which essentially consists of a filter, a pressure regulating valve, a pneumatic FL (regulator-lubricator), electromagnetic valves, a silencer, pipes and the like, and is used to control air cylinders to stretch out and draw back.

The system also comprises an electrical control system which consists of a control cabinet, a control station, and execution and detection components.

For die location, proximity switches are mounted at corresponding positions on the cart. For example, proximity switches are mounted at positions of 1.5 m, 1.8 m, and 2.0 m. Also, proximity switches are mounted on the upper working table. When a die passes by a corresponding proximity switch while being transferred from the storage table into the cart, the size of the die is determined, and the corresponding proximity switch operates to slow down and stop the die.

A die change method provided by the present invention is as follows:

2.1 Back-and-forth motion of the cart is achieved by the driving motor driving the flat-face wheels on the lower working table to transfer power to the guide wheels by means of the first-layer power shaft and thus drive the first-layer driven shaft to move together. Left-and-right motion of the cart is achieved by the driving motor on the upper working table driving the second-layer power shaft to transfer power to the guide wheels by means of the coupling, thereby driving the second-layer driven shaft to move.

2.2 Die unloading (shifting of a die from the working table to the storage table): when the cart moves in place at the working table, the push-and-pull device, the push-and-pull shackles, the die lifting arm, and the left and right baffles rise, and the push-and-pull head driving motor drives the push-and-pull head to move forwards. After the push-and-pull head moves in place, the push-and-pull shackles close to the side of the working table fall down to hook on to the die, and the push-and-pull head driving motor reverses to pull the die onto the cart; and when the die is in place, the hook blocks unhook by means of the push-and-pull shackles and the size of the die is determined with the die lifting arm falling down and the front, rear, left and right baffles rising.

The push-and-pull device and the push-and-pull shackles fall down. The push-and-pull device close to the side of the working table rises and the push-and-pull shackles rise too. The cart moves rightwards on the guide rails, and when the cart being in place is detected by the guide rail detection plates, the direction of motion is changed by the hydraulic system devices and the guide wheels, i.e., changing from rightward motion into back-and-forth motion (the oil cylinders jack up the upper working table to rise, and the flat-face wheels and the guide wheels of the lower working table come into contact with the guide rails); the risen push-and-pull device and shackles fall down, and when the cart reaches a specified storage table position, the baffles on the right of the cart fall down, and the fixed supporting plate driving motor of the cart drives the chain wheels to drive the rollers on the chain wheels by means of the chains to move; meanwhile, the motor on the storage table also drives the chain wheels to drive the rollers by means of the chains to move; finally, the die is moved onto the storage table, and after being in place, the die is jacked up by the cylinder pins by means of the pneumatic devices. The front, rear and left baffles of the cart fall down afterwards. The cart then moves to the starting position.

2.3 Die loading (shifting of a die from the storage table to the working table): the cart moves to the specified storage table position and is in place, and then the front and rear baffles of the cart as well as three baffles on the left rise, while three baffles on the right fall down, and the cylinder pins are dropped down by the pneumatic control system; the fixed supporting plate driving motor of the cart drives the chain wheels to drive the rollers on the chain wheels by means of the chains to move, and simultaneously, the motor on the storage table also drives the chain wheels to drive the rollers to move by means of the chains; meanwhile, the size of the die is detected and determined, and the baffles on the left fall down correspondingly. After the die is moved in place on the cart, the corresponding baffles on the right rise according to the determined size of the die. The direction of motion is changed when the cart reaches the direction change position through back-and-forth motion to change the back-and-forth motion into leftward motion (the hydraulic control system controls the oil cylinders to stretch out and draw back, allowing the lower working table to rise, such that the flat-face wheels and the guide wheels of the upper working table come into contact with the guide rails), and the push-and-pull device and the push-and-pull shackles close to the side of the working table rise; after the cart moves leftwards in place, the risen push-and-pull device and the push-and-pull shackles fall down with the front and rear baffles falling down and the die lifting arm rising; the push-and-pull device and the push-and-pull shackles on the other side rise, while the push-and-pull head driving motor drives the push-and-pull head to move forwards, and the hook blocks are jacked by the shackles to hook on to the die with the push blocks of the push-and-pull head pushing the die to move forwards; after the die is pushed onto the working table in place, the push-and-pull head shackles close to the side of the working table are jacked up to jack up the push-and-pull hook blocks, and the push-and-pull head driving motor reverses such that the push-and-pull head moves backwards with the hook blocks separating from the die; after the push-and-pull head moves backwards in place, the push-and-pull device and the push-and-pull shackles fall down, and so do the die lifting arm and the baffles on the left and right; the push-and-pull device and the push-and-pull shackles close to the side of the working table rise; the direction of motion is changed when the cart reaches the direction change position through rightward motion to change the rightward motion into back-and-forth motion (the hydraulic cylinders jack up the upper working table to rise, allowing the flat-face wheels and the guide wheels of the lower working table to come into contact with the guide rails); then, the push-and-pull device and the push-and-pull shackles close to the side of the working table fall down, and the cart moves to the starting position.

2.4 From the working table to a maintenance room: the cart moves from the starting point to the direction change position; the direction of the cart is changed; the push-and-pull device and the shackles close to the side of the working table rise, and back-and-forth motion of the cart is changed into leftward motion; after the cart moves in place at the working table, the risen push-and-pull head device falls down; the push-and-pull device on the other side rises, and so do the push-and-pull shackles, the die lifting arm, and the left and right baffles; the push-and-pull head driving motor drives the push-and-pull head to move forwards; after the push-and-pull head moves in place, the push-and-pull head shackles close to the side of the working table fall down such that the hook blocks hook on to the die, and the push-and-pull head driving motor reverses to pull the die onto the cart with the size of the die being determined; when the die is in place, the hook blocks unhook by means of the push-and-pull shackles with the front and rear baffles rising and the die lifting arm falling down. The risen push-and-pull device and push-and-pull shackles fall down, while the push-and-pull device close to the side of the working table as well as the push-and-pull shackles rise; the cart moves rightwards on the guide rails, and when a guide rail detection plate detects that the cart is in place, the direction of motion is changed by the hydraulic system devices and the guide wheels, allowing to change from rightward motion into back-and-forth motion. The risen push-and-pull device and shacks fall down; when the cart moves into the maintenance room, the front, rear, left and right baffles fall down, and the die is conveyed by means of an overhead traveling crane to a specified position for die maintenance. The cart then returns to the starting position.

2.5 From the maintenance room to the working table: after the cart moves from the starting position to the maintenance room and is in place, the die is moved onto the cart by the overhead traveling crane, and the front, rear, left and right baffles are controlled in a manual adjustment mode to rise in place. The cart moves rightwards on the guide rails, and when a guide rail detection plate detects that the cart is in place, the direction of motion is changed by the hydraulic system devices and the guide wheels, allowing to change from rightward motion into back-and-forth motion. The cart moves backwards, and when a guide rail detection plate detects that the cart reaches the direction change position, the push-and-pull device of the cart that is close to the side of the working table rises, and the push-and-pull shackles rise, and the direction of motion of the cart is changed by the hydraulic system devices and the guide wheels, allowing to change from backward motion into leftward motion; when the cart moves in place at the working table, the risen push-and-pull head device and shackles fall down, while the push-and-pull head device and the shackles on the other side rise with the die lifting arm rising and the front and rear baffles falling down; the push-and-pull head driving motor drives the push-and-pull head to move forwards with the hook blocks being jacked up by the shackles to hook on to the die and the push blocks of the push-and-pull head pushing the die to move forwards; after the die is pushed in place at the working table, the push-and-pull head shackles close to the side of the working table rise to jack up the push-and-pull hook blocks, and the push-and-pull head driving motor reverses such that the push-and-pull head moves backwards and the hook blocks separate from the die; after the push-and-pull head moves backwards in place, the push-and-pull device and the push-and-pull shackles fall down as well as the die lifting arm and the left and right baffles, while the push-and-pull head device and the shackles close to the side of the working table rise; the cart reaches the direction change position through rightward motion, the direction of motion is changed, allowing to change from the rightward motion into back-and-forth motion (the oil cylinders jack up the upper working table to rise, allowing the flat-face wheels and the guide wheels of the lower working tables to come into contact with the guide rails); and then the cart moves to the starting position.

2.6 Shifting of a die from the maintenance room to the storage table: the die is moved onto the cart by the overhead traveling crane, and the front, rear, left and right baffles are controlled in the manual adjustment mode to rise in place. The cart moves rightwards to the direction change position and is in place, and the direction of motion of the cart is changed, allowing to change from rightward motion into back-and-forth motion (the oil cylinders jack up the upper working table to rise, allowing the flat-face wheels and the guide wheels of the lower working table to come into contact with the guide rails); when the cart reaches the specified storage table position, the right baffles fall down, the fixed supporting plate driving motor of the cart drives the chain wheels to drive the rollers on the chain wheels by means of the chains to move, and simultaneously, the motor on the storage table also drives the chain wheels to drive the rollers to move by means of the chains; finally, the die is moved onto the storage table, and after being in place, the die is jacked up by the cylinder pins by means of the pneumatic devices. The front, rear and left baffles of the cart fall down afterwards. The cart then moves to the starting position.

2.7 Shifting of a die from the storage table to the maintenance room: the cart moves from the starting position to the specified storage table position and is in place, and then the front and rear baffles as well as three baffles on the left rise, while three baffles on the right fall down, and the cylinder pins are dropped down by the pneumatic control system; the fixed supporting plate driving motor of the cart drives the chain wheels to drive the rollers on the chain wheels by means of the chains to move, and simultaneously, the motor on the storage table also drives the chain wheels to drive the rollers to move by means of the chains; meanwhile, the size of the die is detected and determined, and the baffles on the left fall down correspondingly. After the die is moved in place on the cart, the corresponding baffles on the right rise according to the determined size of the die. The direction of motion is changed when the cart reaches the direction change position through back-and-forth motion (the oil cylinders stretch out and draw back, allowing the lower working table to rise, such that the flat-face wheels and the guide wheels of the upper working table come into contact with the guide rails), allowing to change from the back-and-forth motion into leftward motion. The cart moves in place at the maintenance room. The front, rear, left and right baffles fall down.

2.8 Cart moving from the starting point to the maintenance room: the cart moves forwards to the direction change position and is in place; the direction of motion is changed to change the forward motion into leftward motion (the oil cylinders stretch out and draw back, allowing the lower working table to rise, such that the flat-face wheels and the guide wheels of the upper working table come into contact with the guide rails); and the cart enters the maintenance room and moves in place.

2.9 Cart moving from the maintenance room to the starting point under a condition (the front, rear, left and right baffles have all fallen down): the cart moves rightwards to the direction change position and is in place, the direction of motion of the cart is changed to change the rightward motion into back-and-forth motion (the oil cylinders jack up the upper working table to rise, allowing the flat-face wheels and the guide wheels of the lower working table to come into contact with the guide rails); and the cart moves to the starting point after the direction change is completed. While the specific embodiments of the present invention are described above in conjunction with the figures, they are not limitations to the scope of protection of the present invention. Those skilled in the art will recognize that various modifications or variations that a person skilled in the art can make on the basis of the technical solution of the present invention still fall into the scope of protection of the present invention.

The invention claimed is:

1. A full-automatic wireless die change cart for a press, comprising:
   an upper working table and a lower working table which are connected together up and down by means of driving devices,
      wherein the lower working table is driven by a driving device I to move back and forth with respect to an axis of the die change cart, while the upper working table is driven by a driving device II to move rightwards or leftwards with respect to the axis of the die change cart;
   wherein baffles, die lifting arms, and guide rails, all in parallel to one another, are disposed in order from outside to inside at two opposite ends of the upper working table, and push-and-pull devices, baffles, and fixed supporting plate assemblies are disposed in order from outside to inside at the other two ends perpendicular to said two ends,
   wherein the baffles, the die lifting arms, the guide rails, the push-and-pull devices, and the fixed supporting plate assemblies at the opposite ends are pairwise symmetric about center lines of the upper working table; and the baffles, the die lifting arms, the push-and-pull devices, the guide rails and the fixed supporting plate assemblies are capable of moving up and down when driven by respective driving devices III;
   up-and-down motion of the upper working table and the lower working table is controlled by two-way oil cylinders, and proximity switches are mounted on the upper working table to control a distance of extension or retraction,
      wherein two ends of the baffles are connected to oil cylinders that control the baffles to rise and fall, and a distance of rising or falling is controlled by means of proximity switches;
      wherein at least some of the oil cylinders are two-way oil cylinders and are mounted at lower ends of the push-and-pull devices, and proximity switches for controlling the rising and falling of the push-and-pull devices are mounted on the upper working table;
      wherein at least some of the oil cylinders are two-way oil cylinders and are mounted at two ends of the die lifting arms, and fixed to the upper working table, and proximity switches for controlling the rising and falling of the die lifting arms are mounted on the upper working table.

2. The full-automatic wireless die change cart according to claim 1, wherein each of the push-and-pull devices comprises a support; a motor is mounted on the support; the motor is connected to two driving shafts by means of couplings; a chain wheel is mounted on each driving shaft; each chain wheel drives a chain block to move along long guide rails by means of a chain, and the two chain blocks are both connected to a connecting plate; and hook blocks are disposed at two ends of the two connecting plates, respectively.

3. The full-automatic wireless die change cart according to claim 2, wherein a shackle is disposed at one side of each hook block; a bottom of the shackle is driven by an air cylinder; and the shackles serve to, when a die is pulled in place by means of a push-and-pull head on the device, separate the hook blocks on the push-and-pull head from the die.

4. The full-automatic wireless die change cart according to claim 1, wherein the die lifting arm comprises a rectangular hollow support; a plurality of pin shafts are disposed in parallel within and connected to the support, and a roller sleeves each pin shaft.

5. The full-automatic wireless die change cart according to claim 1, wherein the fixed supporting plate assembly comprises a rectangular hollow fixed supporting plate; a plurality of pin shafts are disposed within and connected to the fixed supporting plate; a roller sleeves each pin shaft; and a motor driving device is mounted at one end of the fixed supporting plate, and connected to a plurality of chain wheels mounted at a side of the fixed supporting plate by means of chains.

6. The full-automatic wireless die change cart according to claim 1, wherein a first-layer power shaft driven by a motor I is mounted at one side of the lower working table, while a first-layer driven shaft is mounted at the other side thereof; flat-face wheels are mounted on the first-layer power shaft, while guide wheels are mounted on the first-layer driven shaft, and the driving motor I drives the first-layer power shaft to rotate, driving the first-layer driven shaft to move back and forth;

a power shaft or a second-layer power shaft driven by a motor II is mounted at one side of the upper working table, while a second-layer driven shaft is mounted at the other side thereof;

flat-face wheels are mounted on the second-layer power shaft, while guide wheels are mounted on the second-layer driven shaft, and the driving motor II drives the second-layer power shaft to rotate, driving the second-layer driven shaft to move rightwards or leftwards.

7. The full-automatic wireless die change cart according to claim 1, wherein the driving devices, the driving device I, the driving device II and the driving devices III are connected to respective controllers; the respective controllers communicate with a master control station by means of a wireless network; and the master control station is connected to a remote control device by means of a wireless network.

8. A full-automatic wireless die change system for a press, wherein the system comprises:

the die change cart according to claim 7;

an automatic charging device, location detection plates and a storage table, each of which are mounted at sides of the guide rails, wherein the die change cart moves laterally and longitudinally along the guide rails, and wherein the die change cart, the automatic charging device, the detection plates and the storage table are all controlled by the master control station.

9. The full-automatic wireless die change system according to claim 8, wherein the storage table comprises a support; a plurality of rollers are mounted at two ends of the support, and a driving motor is mounted at the bottom of the support; the driving motor drives chain wheels mounted on roller driving shafts to rotate by means of chains; and air cylinder driving devices are disposed at the end of the support that is adjacent to the guide rails.

* * * * *